April 14, 1925.
S. C. LINDEN
1,533,433
MULTIPLE EXPOSURE ATTACHMENT FOR CAMERAS
Filed March 15, 1923    2 Sheets-Sheet 1
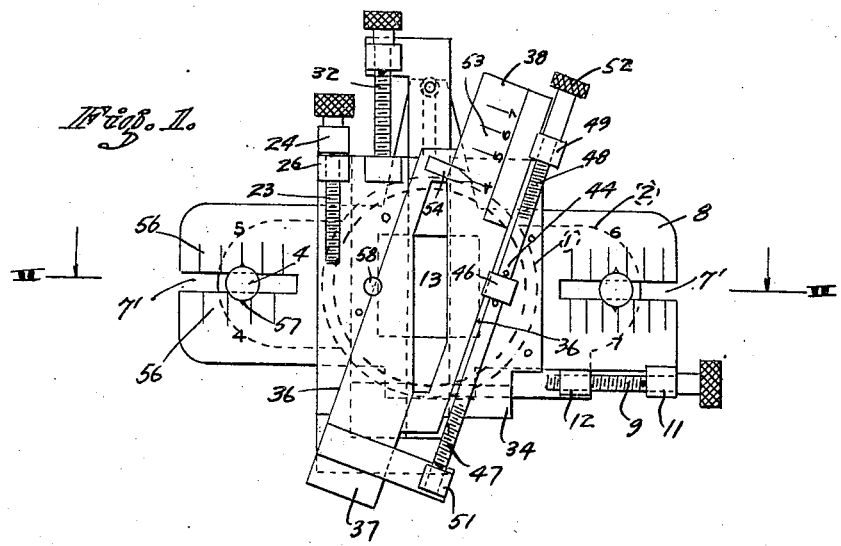
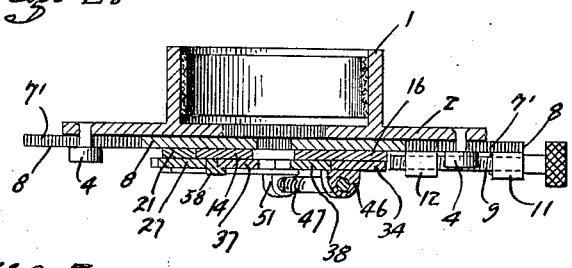
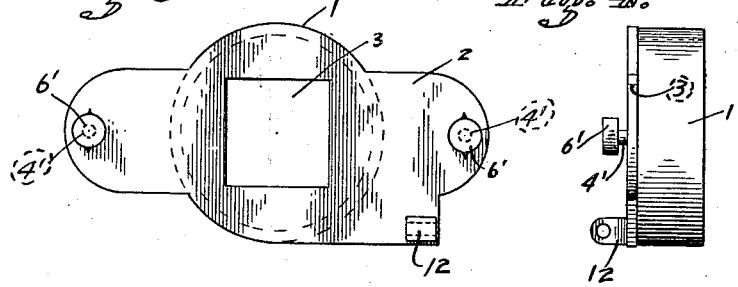
INVENTOR.
S. CHRISTIAN LINDEN
BY
ATTORNEYS.

April 14, 1925.
S. C. LINDEN
1,533,433
MULTIPLE EXPOSURE ATTACHMENT FOR CAMERAS
Filed March 15, 1923    2 Sheets-Sheet 2
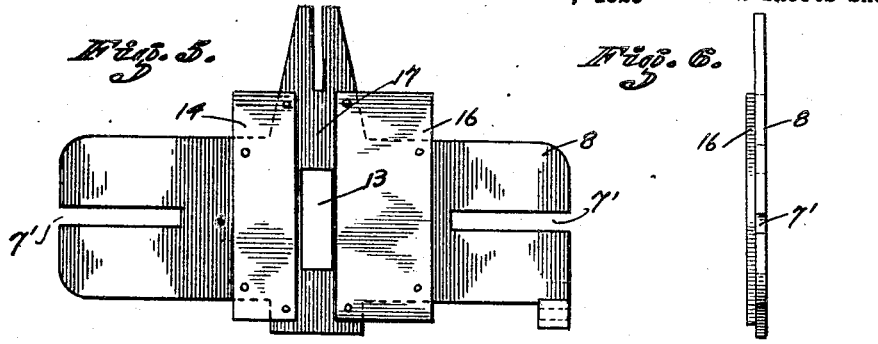
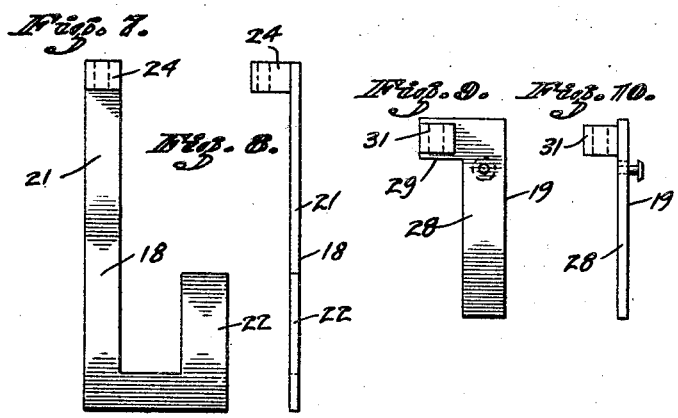
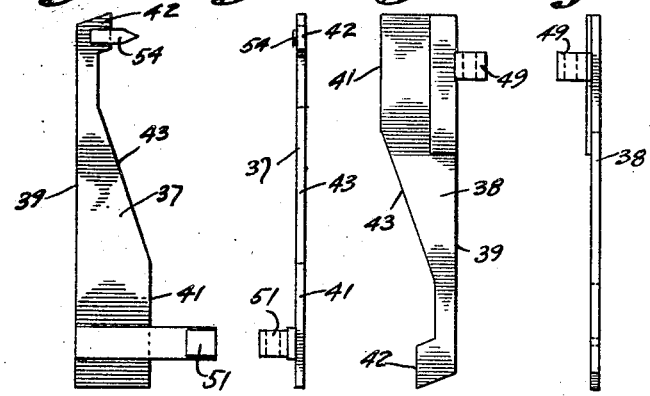
INVENTOR.
S. CHRISTIAN LINDEN
BY
ATTORNEYS.

Patented Apr. 14, 1925.

1,533,433

UNITED STATES PATENT OFFICE.

SVENNUM CHRISTIAN LINDEN, OF SAN FRANCISCO, CALIFORNIA.

MULTIPLE-EXPOSURE ATTACHMENT FOR CAMERAS.

Application filed March 15, 1923. Serial No. 625,344.

*To all whom it may concern:*

Be it known that I, SVENNUM CHRISTIAN LINDEN, a citizen of the United States, and a resident of San Francisco, county of San Francisco, State of California, have invented a new and useful Multiple-Exposure Attachment for Cameras, of which the following is a specification.

The present invention relates to improvements in cameras and has particular reference to a camera attachment allowing several exposures to be made of a single film in such a manner for instance that the same person can be shown on the picture in various positions and in different places on the same background. It is particularly proposed to control the aperture of the camera in such a manner that whenever a single picture is taken a portion only of the film is exposed allowing the person or object whose picture is taken to move to a different place and to change his or its position before a second part of the film is exposed for the purpose of taking a second picture on the same background. Various other objects and advantages of the device will appear as the specification proceeds.

The preferred form of the invention is illustrated in the accompanying drawing in which Figure 1 shows a front view of my camera attachment. Figure 2 a horizontal section through the same taken along line II—II of Figure 1, Figure 3 a detail view of a fixed plate forming part of my attachment, Figure 4 an end view of the same, Figure 5 a detail view of a movable plate, Figure 6 an end view of the same, Figures 7, 8, 9 and 10 front and end views respectively of two plates controlling the vertical dimension of the slot through which the film is exposed, Figures 11 and 12 front and end views respectively of a guide plate, and Figures 13, 14, 15 and 16 front and end views respectively of two plates moving diagonally for the purpose of defining the width of the exposure. While I have shown only the preferred form of the invention it should be understood that various changes or modifications may be made within the scope of the claims hereto attached without departing from the spirit of the invention.

My attachment may be used in connection with any camera now on the market and is preferably attached thereto by means of a tubular member (1) adapted to fit over the hood of the camera and secured to a plate (2) shown in detail in Figure 3, which latter is provided with an aperture (3) of such size as to expose the whole film so that it normally would not interfere with the taking of a picture in the usual manner. The plate (2) is oblong in form and has two screws (4') secured in its extreme ends on the horizontal center line, the heads (6') of which are adapted to ride on slots (7') of a second plate (8) mounted slidably on the first plate with freedom of horizontal motion. Motion is imparted to the second plate by means of a screw (9) extending through a projection (11) rising from the edge of the second plate and held against longitudinal motion relative to the projection which screw threadedly engages a projection (12) rising from the fixed plate (2). By means of this screw arrangement the motion of the second plate relative to the first plate can be very closely adjusted.

The second plate which is illustrated in detail in Figures 5 and 6 is provided with a slot (13) of substantially the same vertical dimension as the slot (3) in the first plate but considerably narrower than the latter, its width being such as to expose only a portion of the film at a time. Alongside of this slot are arranged two guide members (14) and (16) providing a vertical guideway (17) for the two plates (18) and (19) designed to cooperate in controlling the vertical dimension of the slot (13). The plate (18) see Fig. 7 is substantially U-shaped presenting a long arm (21) and a short arm (22). The short arm (22) is adapted to ride in the guideway (17) controlling the lower end of the aperture (13) while the long arm (21) rides on the lefthand side of the guide plate (14). Vertical motion is imparted to the plate (18) by means of the screw (23) held against sliding motion in a projection (24) rising from the plate (18) and threadedly engaging a projection (26) rising from a super-imposed guide member (27) to be described hereinafter.

The plate (19) see Figures 9 and 10 which has the shape of an inverted L controls the upper portion of the slot (13). Its leg (28) also rides in the guideway (17) while its arm (29) extends transversely and is provided with a projection (31) adapted to receive a screw (32) held against endwise motion within the projection and threadedly engaging a second projection (33) on the guide plate (27). It will be noted that by operating either the screw (23) or the screw (32) the vertical dimension of the aperture (13) can be changed. The dimensions are preferably made such that when the plate (21) is screwed up to its highest position only the upper half of the aperture (13) is exposed while when the plate (18) is screwed downward to its lowermost position and the plate (19) is also lowered only the lower half of the aperture (13) is exposed.

On top of the members (14) and (16) are secured two further guide members, namely the previously mentioned member (27) and a member (34), see Figures 1, 2, 11 and 12, the two members being disposed in such a manner that the opposing faces (36) form diagonal guides for two plates (37) and (38) shown in detail in Figures 13 to 16. The two plates have outer edges (39) engaging the faces (36) and running parallel to one another. Certain portions (41) and (42) of their inner edges also run parallel to the guide faces (36) and are adapted to slidably engage one another. But the inner edges are recessed so as to form two parallel faces (43) which are disposed vertically when the two plates occupy their diagonal position and which approach one another or recede from one another when diagonal motion is imparted to the two plates. The latter motion is preferably brought about by means of a rod (44) rotatably supported in a projection (46) extending from the guide member (34) and threadedly engaging by oppositely wound threads (47) and (48) two projections (49) and (51) associated with the two plates. In this manner rotary motion of the rod (44) which is actuated by means of a nob (52) is adapted to widen or to narrow the vertical slot between the two plates (37) and (38). Since this latter adjustment defines the width of the slot actually used it is highly important that the operator be enabled to adjust the device to the exact size of the picture wanted. For this purpose I provide a graduated scale (53) on one of the plates with a pointer (54) on the other plate moving over the same. It will be noted that the scale is marked 4, 5, 6 and 7 respectively indicating that when the pointer (54) is brought opposite the line marked 4 the width of the slot is such that four pictures may be successively taken along a horizontal line. If the plates are moved toward one another so that the pointer is brought opposite the line marked 5 the slot is made smaller and now five pictures may be taken along a horizontal line.

It will be noted that the plate (8) is also provided with graduated scales (56), one scale being provided for each different width of slot. If for instance the slot is set to allow of the taking of four pictures the scale on the plate (8) marked 4 is used and the pointer (57) provided on the head (6') of the nut (4') is brought opposite the left hand line of the scale marked 4. After a picture has been taken it is forwarded to the second line on the same scale and so on to the third and fourth lines respectively until all the four pictures have been taken. If it is desired to take seven pictures in one horizontal line the width of the slot is reduced until the pointer (54) alines with the mark 7 on the scale (53) and for advancing the plate (8) the corresponding scale marked 7 on the plate (8) is used. To hold the two plates (37) and (38) between their respective guides I provide a pin (58) the head of which projects over the plate (37) and I shape the projection (46) in such a manner that it slightly projects over the plate (38).

The operation of the device should be readily understood from the foregoing description. The attachment is placed over the hood of the camera. Assuming that the operator wishes to take two rows of exposures with the upper row containing five pictures and the lower row containing four pictures he proceeds as follows: First he turns the screw (23) until the plate (18) reaches its lowermost position. He then turns the screw (32) until the plate (19) covers the upper half of the aperture. Next he turns the rod (44) until the pointer (54) is brought opposite the line marked 4 on the scale (53) which means that the slot has been adjusted to a width that if moved over the aperture (3) will allow of four different exposures. Then the screw (9) is turned until the pointer (57) on the head (6') is brought opposite the first line on the scale marked 4. Now the first picture may be taken whereupon the slot is moved laterally by means of the screw (9) until the pointer (57) on the head reaches the second line and so on. After the lower row of pictures has been completed the plate (18) is raised to cover the lower half of the slot and the plate (19) is also raised to clear the upper half of the slot. The slot is then narrowed slightly by bringing the pointer (54) opposite the line marked 5 on the scale (53). Now five pictures may be taken successively in the upper row by using the pointer on the head (6') in connection with the scale marked 5 on the plate (8).

I claim:

1. A camera attachment comprising a fixed plate having an aperture therein exposing the whole area of the film, a second plate movable thereon having a smaller aperture exposing a part only of the film, means for advancing the second plate over the first plate whereby parts of the same film are exposed successively and means for adjusting the width of the second aperture, comprising a pair of plates mounted on the second plate with freedom of diagonal sliding motion having parallel edges facing one another so as to define a slot adapted to be widened and narrowed by relative motion of the plates.

2. A camera attachment comprising a fixed plate having an aperture therein exposing the whole area of the film, a second plate movable thereon having a smaller aperture exposing a part only of the film, means for advancing the second plate over the first plate whereby parts of the same film are exposed successively and means for adjusting the width of the second aperture, comprising a pair of plates mounted on the second plate with freedom of diagonal sliding motion having parallel edges facing one another so as to define a slot adapted to be widened and narrowed by relative motion of the plates, with corresponding indicating means provided for the motion of the second plate relative to the first plate and for the relative motion of the two diagonal plates for timing the two motions.

3. A camera attachment comprising a fixed plate having an aperture therein exposing the whole area of the film, a second plate movable thereon having a smaller aperture exposing a part only of the film, means for advancing the second plate over the first plate whereby parts of the same film are exposed successively and means for adjusting the vertical length and height of the second aperture.

4. A camera attachment comprising a fixed plate having an aperture therein exposing the whole area of the film, a second plate movable thereon having a smaller aperture exposing a part only of the film, means for advancing the second plate over the first plate whereby parts of the same film are exposed successively and means for adjusting the vertical length and height of the second aperture, comprising a pair of plate mounted on the second plate with freedom of vertical sliding motion having horizontal edges facing one another so as to define a slot adapted to be lengthened and shortened and to be moved vertically by relative motion of the plates.

SVENNUM CHRISTIAN LINDEN.